United States Patent
Robinson (10) Patent No.: US 10,123,516 B2
(45) Date of Patent: Nov. 13, 2018

(54) AQUACULTURE REARING ENCLOSURE AND CIRCULATION INDUCTION SYSTEM

(71) Applicant: Agrimarine Industries Inc., Vancouver (CA)

(72) Inventor: Stephen Robinson, Campbell River (CA)

(73) Assignee: AGRIMARINE INDUSTRIES INC., Vancouver BC (CA)

( * ) Notice: Subject to any disclaimer, the term of this patent is extended or adjusted under 35 U.S.C. 154(b) by 119 days.

(21) Appl. No.: 14/411,385

(22) PCT Filed: Jun. 25, 2013

(86) PCT No.: PCT/CA2013/050492
§ 371 (c)(1),
(2) Date: Dec. 24, 2014

(87) PCT Pub. No.: WO2014/000102
PCT Pub. Date: Jan. 3, 2014

(65) Prior Publication Data
US 2015/0150223 A1    Jun. 4, 2015

(30) Foreign Application Priority Data
Jun. 26, 2012 (CA) ..................... 2780691

(51) Int. Cl.
*A01K 63/04*   (2006.01)
*A01K 61/60*   (2017.01)

(52) U.S. Cl.
CPC ............ *A01K 63/047* (2013.01); *A01K 61/60* (2017.01); *Y02A 40/826* (2018.01)

(58) Field of Classification Search
CPC .... A01K 63/047; A01K 61/007; A01K 61/60; B01F 3/04609; B01F 13/0049; C02F 3/16; C02F 3/165; C02F 1/36; C02F 1/48; C02F 1/463; C02F 2101/105; C02F 2209/22; C02F 7/00; Y02A 40/826
USPC ........................................................ 119/223
See application file for complete search history.

(56) References Cited

U.S. PATENT DOCUMENTS

| 4,655,169 A * | 4/1987 | Pullola ................... A01K 63/04 |
| | | 119/228 |
| 2008/0169229 A1* | 7/2008 | Tormaschy ......... B01F 3/04609 |
| | | 210/170.05 |

FOREIGN PATENT DOCUMENTS

| CA | 2104303 A1 * | 6/1993 | ............. A01K 61/00 |
| EP | 0574589 A1 * | 12/1993 | ............. A01K 63/04 |
| GB | 2200822 A * | 8/1988 | ........... A01K 61/007 |

* cited by examiner

Primary Examiner — Ko H Chan (57) ABSTRACT

A system for efficiently circulating water in a large volume of rearing space for aquatic organisms, comprising an impervious enclosure for containing the water and aquatic organisms and a pump for pumping water from an intake duct through intake ducting to a flow diverter, which then directs a flow of water radially outward within the enclosure to directly induce a circulation of water within the enclosure. The 'center drive' circulation pattern is sufficiently uniform to provide optimum rearing conditions for cultured finfish, while also ensuring that solid wastes are swept toward the central drain, even in a very large tank.

36 Claims, 8 Drawing Sheets

AQUACULTURE REARING ENCLOSURE AND CIRCULATION INDUCTION SYSTEM

FIELD OF INVENTION

This invention relates to the rearing of aquatic organisms in a controlled environment and more particularly to impervious closed-container rearing systems enclosing and efficiently circulating water in a large volume of rearing space.

BACKGROUND OF THE INVENTION

Methods and equipment for induction of circulating flow in aquaculture enclosures are known in the art. Circular tanks are most commonly used, due to their inherent structural strength, and because they can maintain a characteristic rotating flow, against which finfish are induced to swim. Swimming exercise is believed to promote weight gain and feed conversion efficiency in some species of finfish.

In one common design, water is introduced into a circular rearing tank at the perimeter, in a tangential direction, so as to impart angular momentum to the fluid flow, and is withdrawn from the central axis of the tank through a standpipe or floor drain. The primary flow in this design follows a spiral path from the perimeter toward the center. It is also known that such azimuthal flow in circular tanks induces a secondary, toroidal flow by a mechanism known as the 'teacup effect'; centrifugal pressure exerted on fluid at the rotating free surface boundary is not balanced by the slower boundary layer-influenced flow adjacent to the floor of the tank. The pressure imbalance induces flow radially outward along the free surface, down the vertical tank wall, and radially inward across the floor, back to the central axis, where fluid is displaced vertically upward creating a hydraulic circuit. The teacup effect is responsible for the self-cleaning property of circular tanks, whereby settle-able solid debris, including fecal matter, uneaten feed pellets, and moribund fish, are swept in a spiral path toward the center of the floor and out through a drain.

In a variant of this design, the majority of the flow exiting the tank is drawn from an overflow weir at the upper side wall, while the solids exit through the center drain with the remainder of the flow. This configuration concentrates the solid waste in a relatively small proportion of the flow stream and facilitates de-watering and treatment steps of recirculating aquaculture systems.

U.S. Pat. Nos. 3,653,358 and 3,698,359 to Fremont describe a watertight liner suspended from a floatation collar of flexibly linked, foam-filled floats and provided with inlet and outlet pipes, and oxygen spargers to continuously oxygenate the enclosed water. Flow pattern is from one end of an elongate enclosure to the other, as is the case with land-based 'raceway' enclosures, or is not specified.

U.S. Pat. No. 4,211,183 to Hoult describes a land-based recirculating aquaculture system with centrally located upwelling pump and central drain with integral bio-filter. In one implementation the bio-filter support follows a spiral path, but no mention is made of the circulation pattern within the rearing volume of the tank, or particularly of the effect of feeding circulation from the central top surface of the water volume.

U.S. Pat. No. 4,798,168 to Vadseth describes a floating closed-containment aquaculture enclosure with an externally mounted vertical pump duct drawing water from depth, discharging horizontally tangentially into the perimeter of the floating enclosure. Water follows a spiral path with induced poloidal component, and exits through a center standpipe drain.

U.S. Pat. No. 6,443,100 to Brenton further describes the flow pattern within floating closed-containment enclosures, and claims a design of standpipe drain for such rearing enclosures that extracts clear effluent and solids through separate pipes.

None of the previously described methods specifically address the changes in intrinsic fluid behavior as aquaculture enclosures are scaled from volumes in the order of 100 cubic meters typical of land-based culture systems to volumes in the order of 10,000 cubic meters required for large scale grow-out operations typical in the modern culture of salmonids and tunas. Such tanks may have diameters of up to 40 meters, and depths to 15 meters. At this scale, two practical difficulties arise with the azimuthal flow pattern and with the teacup effect. Firstly, tangential velocity at the perimeter of the tank produced by the flow volume necessary to exchange the large volume of enclosed water volume in the time required (on the order of one hour) is higher than the preferred swimming speed of the cultured fish, particularly in the early life stages. Secondly, the teacup effect becomes less significant as the Reynolds number of the flow increases. At large scale, turbulence and momentum predominate, while viscosity, which is responsible for the boundary layer which drives the toroidal flow component, is less influential in determining the overall behavior of the flow. In practice, solids are seen to build up on the floor of the tank, the central vortex drifts from the axis or bifurcates, and in extreme cases multiple concentric toroidal vortices develop, with upwelling zones re-suspending solids. The toroidal flow of water within an enclosure will tend to concentrate particles in the center of the enclosure. This is known as the "tea leaf paradox" or "tea leaf effect", a type of momentum coupling effect explained by Albert Einstein in The Cause of the Formation of Meanders in the Courses of Rivers and of the So-Called Baer's Law, Die Naturwissenschaften, Vol. 14, 1926 essentially as follows. Stirring the liquid makes it spin around the cup. In order to maintain this curved path, a centripetal force in towards the center is needed (similar to the tension in a string when spinning a bucket over your head). This is accomplished by a pressure gradient outward (higher pressure outside than inside). However, near the bottom and outer edges the liquid is slowed by the friction against the cup. There the centripetal force is weaker and cannot overcome the pressure gradient, so these pressure differences become more important for the water flow. This is called a boundary layer. Because of inertia, the pressure is higher along the rim than in the middle. If all the liquid rotated as a solid body, the inward (centripetal) force would match the outward (inertial) three from the rotation and there would be no inward or outward movement. In a teacup, where the rotation is slower at the bottom, the pressure gradient takes over and creates an inward flow along the bottom. Higher up, the liquid flows outward instead. This secondary flow travels inward along the bottom bringing the leaves to the center, then up, out and down near the rim. The leaves are too heavy to lift upwards, so they stay in the middle. Combined with the primary rotational flow, the leaves will spiral inward along the bottom. The primary rotational flow is toroidal, and the secondary flow is poloidal. As defined by the Oxford English Dictionary (OED), the "toroidal" direction is the long way around a torus (a donut-shape), and the "poloidal" direction is the short way around the torus. Prior art systems in the field of the invention drive the toroidal flow axis by injecting flow radially at the outside wall, and the secondary poloidal axis flow is induced by teacup effect.

BRIEF SUMMARY OF THE INVENTION

It is an object of the current invention to address the shortcomings of previous methods of inducing circulation when employed in larger floating seaborne tank enclosures, particularly designs in which influent water is introduced in a tangential direction at the perimeter of the tank. It is a further object of the current invention to provide a robust design of pump and ducting system and a buoyantly supported tank which floats within an enclosing water body such as ocean, lake, or reservoir, and which can withstand large environmental loads from waves, wind, tide, and ice. It is a further object of the current invention to provide a platform from which service access to said pump and ducting system is facilitated.

In a basic form the invention has a vertically oriented intake duct and submersible pump inducing vertical upward flow within the duct, located at the central axis of a radially symmetric tank, drawing influent water from some distance below the tank. A flow diverter fitted to the top end of the intake duct directs flow radially outward over the liquid surface enclosed by the tank so as to directly induce a poloidal flow pattern within the tank. The overall flow within the tank resembles the laminar boundary layer-induced 'teacup effect' flow observed in smaller tanks, but with a greater poloidal component, and at a much larger scale.

Because the intake duct, pump, outlet duct, filtration methods, associated floatation, oxygenation and control systems may all be located at a common, central axial platform, advantages are found in construction cost, maintenance access and structural strength. The 'center drive' circulation pattern is sufficiently uniform to provide optimum rearing conditions for cultured finfish, while also ensuring that solid wastes are swept toward the central drain, even in a very large tank.

The invention is essentially a system for efficiently circulating water in a large volume of rearing space for aquatic organisms, comprising an impervious enclosure for containing the water and aquatic organisms and a pump for pumping water from an intake duct through intake ducting to a flow diverter, which then directs a flow of water radially outward within the enclosure to directly induce a circulation of water within the enclosure. By "radially outward" is meant from a center region of the tank toward peripheral regions of the tank, whether substantially along radius lines from a center axis of the tank directly to peripheral points at the tank outer walls, or more indirectly on flow lines that are at acute or obtuse angles to tangents on the periphery of the tank. The directing of the water thus outward results in qualitative advantages that are not provided by the circulation mechanisms of the prior technology.

In a preferred embodiment, the flow diverter directs a flow of water radially outward and induces a poloidal flow to circulate water within a buoyantly supported tank for use in an open body of water. The intake duct is located outside the tank, and the pump draws influent water from outside the tank via the intake duct for the flow diverter, floatation collars for buoyantly supporting the tank being secured around a periphery of the tank by brackets. The flow diverter is centrally located within the impervious enclosure, the intake duct is vertically oriented, the pump is a submersible pump inducing vertical upward flow within the intake duct, comprising a motor which is connected to and rotates an impeller blade by means of an elongated shaft inserted down the intake duct, and the pump and the intake duct are located along the central axis of the impervious enclosure, which is radially symmetric. The intake duct, the pump, and an outlet duct for the flow diverter, are all accessible from a central axial service platform within the impervious enclosure. The impervious enclosure can be an open-topped tank supported by floatation collars and containing a central circulation platform for the intake duct, the flow diverter, the pump, and having a central mast assembly that is suspended by flotation billets to enable floatation of the central circulation platform within the tank and that is anchored to maintain a central location for the circulation platform within the tank. The mast assembly comprises poles embedded in the platform, linked by cross-members, and secured together at the top by a ring which is secured by stays attached to brackets around the periphery of the wall.

The tank can have a filter skirt for trapping debris, a standpipe outlet providing an exit from the impervious enclosure filtered excess water, and an annular gutter for trapping heavier solid debris not caught by the filter skirt, the filter skirt comprising a coaxial upper slot drain and an annular lower slot drain. A vertical standpipe outlet duct is located coaxially to the intake duct, and below the flow diverter.

In its overall structure, the tank comprises a cylindrical wall, a circular bottom, and a central portion holding the intake duct. The floating central circulation platform holding the intake duct and the flow diverter is a structural truss of supporting floatation billets made of foam-filled rotational-molded polyethylene. The central mast assembly is connected by rope stays to brackets supporting the floatation collar, to provide structural support against wave and tidal forces.

In an optimal embodiment, the flow diverter comprises a concentric series of curved vanes that divert a flow of influent liquid pumped up the intake duct and radially spreads the flow of influent liquid along a surface of water within the enclosure from the floating circulation platform to a wall of the impervious enclosure. The flow diverter induces a poloidal flow and a secondary toroidal flow of water within the impervious enclosure.

BRIEF DESCRIPTION OF THE DRAWINGS

FIG. 8a shows a side cutaway reference view of the Tank, while

DETAILED DESCRIPTION

All elements will now be introduced by reference to drawing figures, then how each element functions and interacts with each other element will be described where necessary.

Figure 1:
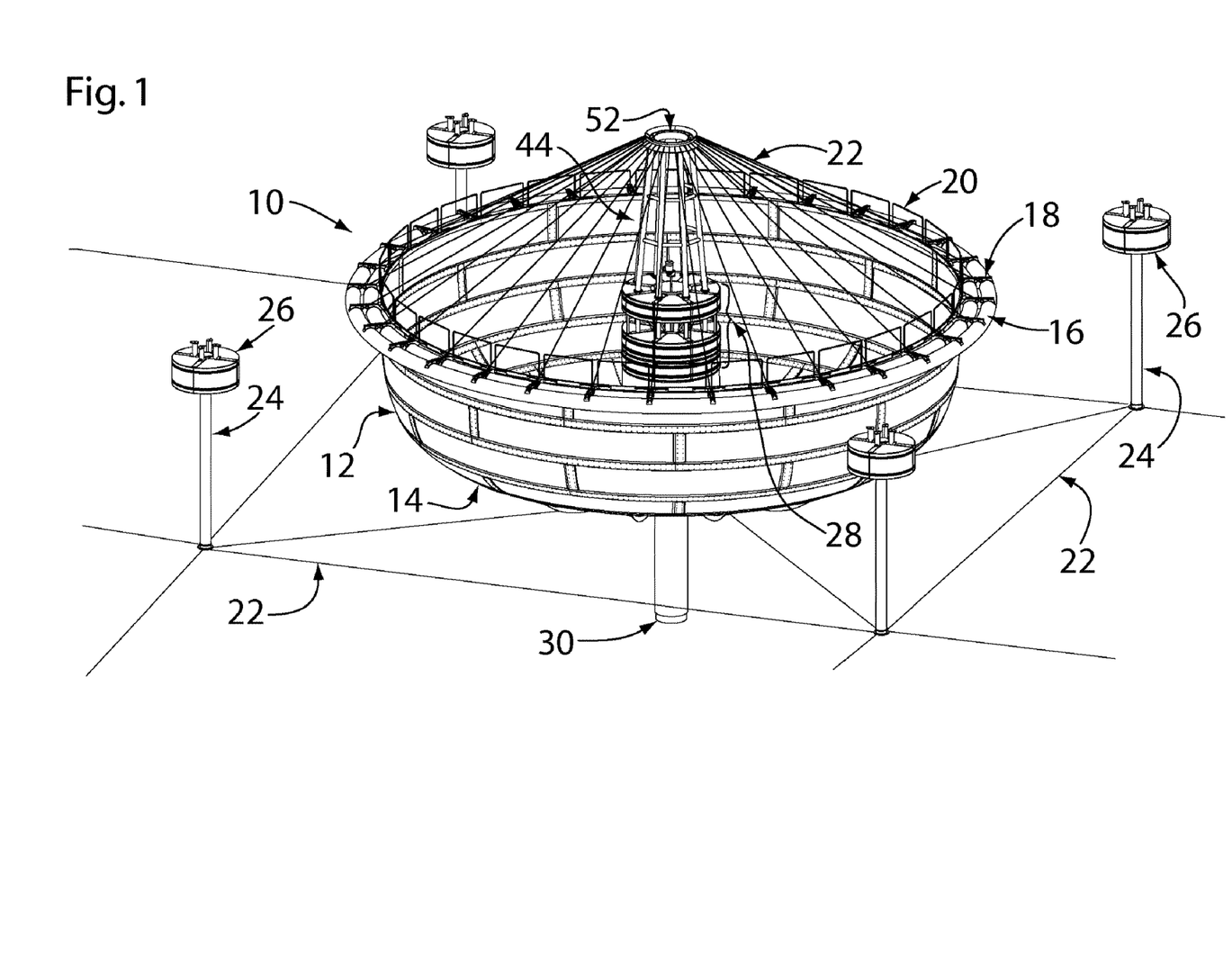
FIG. 1 shows a top isometric overview of an Aquaculture Rearing Enclosure (Tank) moored to Support Buoys (Platform without Flow Diverter)

FIG. 1 shows an overview of an Aquaculture Rearing Enclosure (Tank) 10 secured by mooring lines 22 to support buoys 26 by their underwater spars 24. The tank 10 is comprised of a cylindrical wall 12 and circular bottom 14 with an intake duct 30 at its center. Floatation collars 16 are secured around the tank 10 periphery by brackets 18. Safety hand rails 20 are anchored to the top of the wall 12 between brackets 18; the latter serve as anchors for one end of each rope stay 50 which then attaches to the ring 52 at the top of the mast assembly 44. Note that the Floating Circulation Platform 28 is without its Flow Diverter 32 in order to show the how the mast assembly 44 is anchored within.

Figure 2:
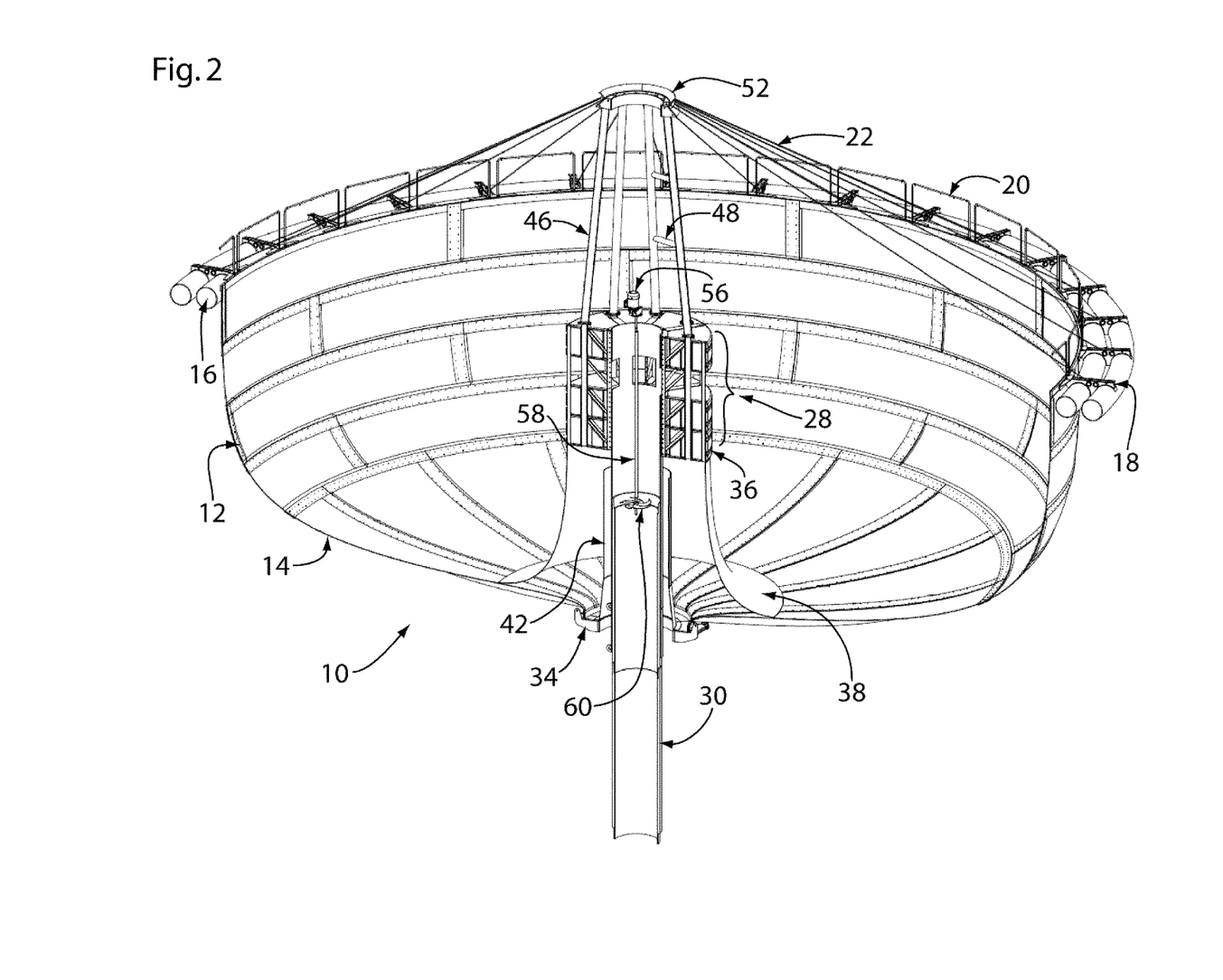
FIG. 2 shows a side isometric cutaway view of an Aquaculture Rearing Enclosure (Tank)

FIG. 2 shows an internal cutaway view of the Aquaculture Rearing Enclosure (Tank) 10. The Floating Circulation Platform (Platform) 28 is comprised of numerous flotation billets 36 which provide buoyancy to support the mast assembly 44, pump assembly 54, filter skirt 38, and intake duct 30. The mast assembly 44 is comprised of poles 46 embedded in the platform 28, linked by cross-members 48, and secured together at the top by a ring 52 which is secured by stays 50 attached to brackets 18 around the periphery of the wall 12. The pump assembly 54 is comprised of a motor 56 which is connected to and rotates an impeller blade 60 by means of an elongated shaft 58 inserted down the intake duct 30. Also shown is the standpipe outlet 42 which is the main exit for filtered excess water and an annular gutter 34 which traps heavier solid debris 66 not caught by the filter skirt 38.

Figure 3:
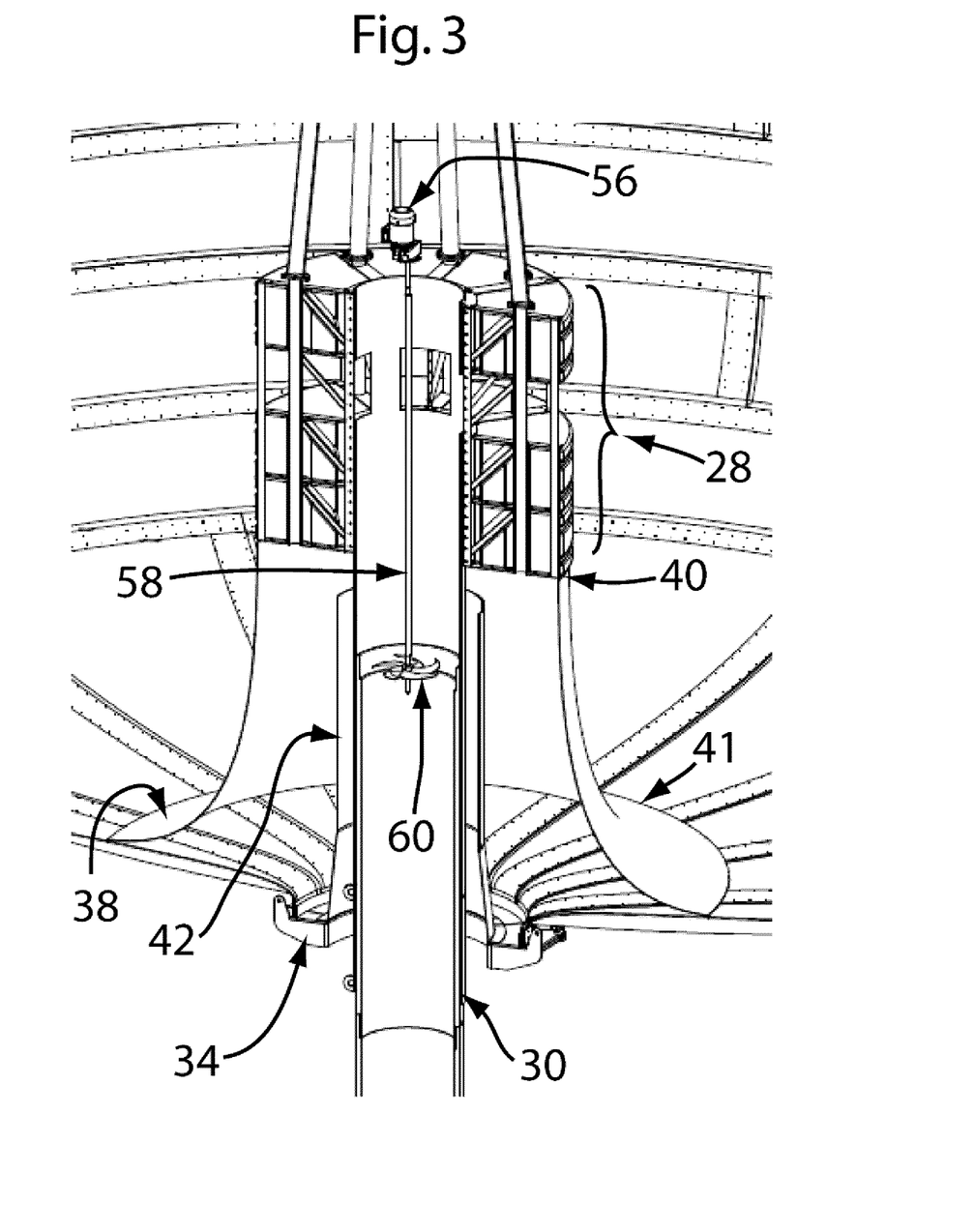
FIG. 3 shows a side isometric close-up cutaway view of the Floating Circulation Platform (Platform), Filter Skirt and associated elements.

FIG. 3 shows a close-up cutaway view of the Floating Circulation Platform 28, with focus on the location of the coaxial upper slot drain 40 and the annular lower slot drain 41, both elements of the filter skirt 38. (see FIGS. 8a & 8b for drainage details) A vertical 'standpipe' outlet 42 duct is located coaxially to the intake duct 30, and below the flow diverter 32 as shown.

Figure 4:
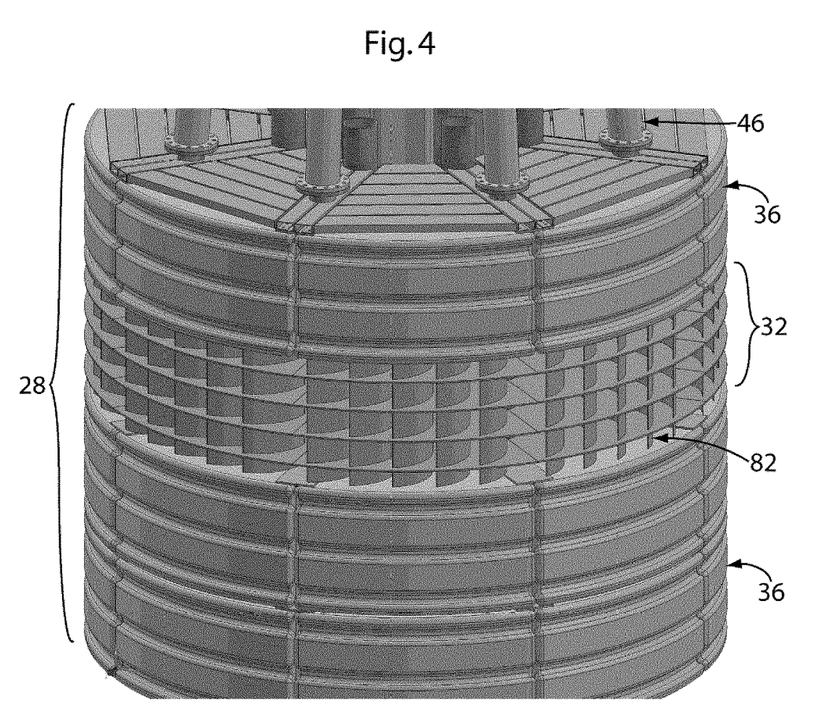
FIG. 4 shows a top isometric view of a Floating Circulation Platform with its Flow Diverter.

FIG. 4 shows a close-up view of a Floating Circulation Platform 28 with its Flow Diverter 32 in place, which is comprised of a concentric series of curved vanes 82 which divert the flow of influent liquid 62 pumped up the intake duct 30 and radially spread it along the water surface 64 from the platform 28 to the wall 12. Also visible are the numerous flotation billets 36 and the base of some poles 46 of the mast assembly 44.

Figure 5:
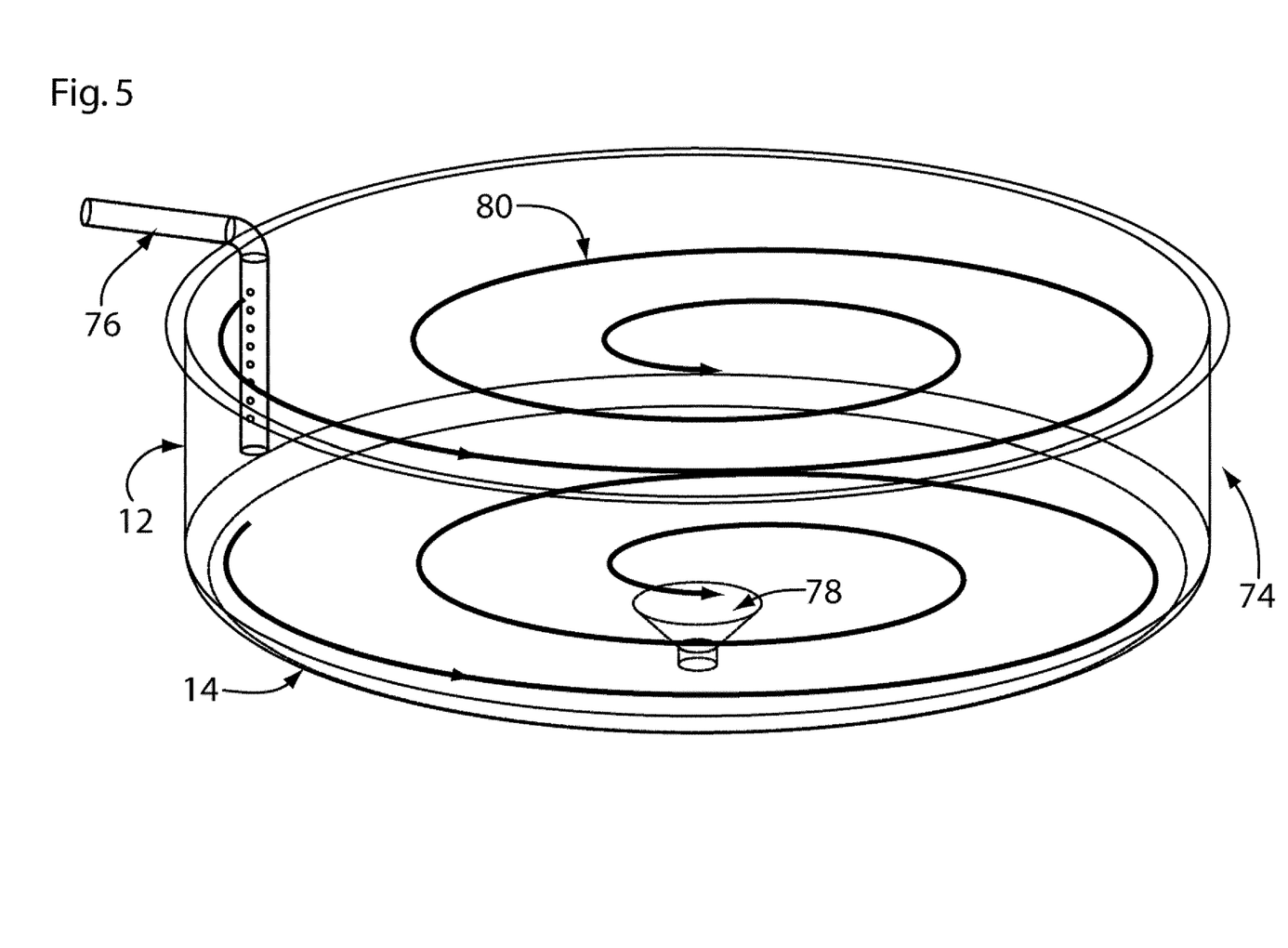
FIG. 5 shows a top isometric prior art Hatchery Tank with its tangential outlet and downward spiral flow pattern.

FIG. 5 shows a prior art Hatchery Tank 74 with its tangential flow outlet 76 creating a spiral flow 80 pattern down towards its drain 78.

Figure 6:
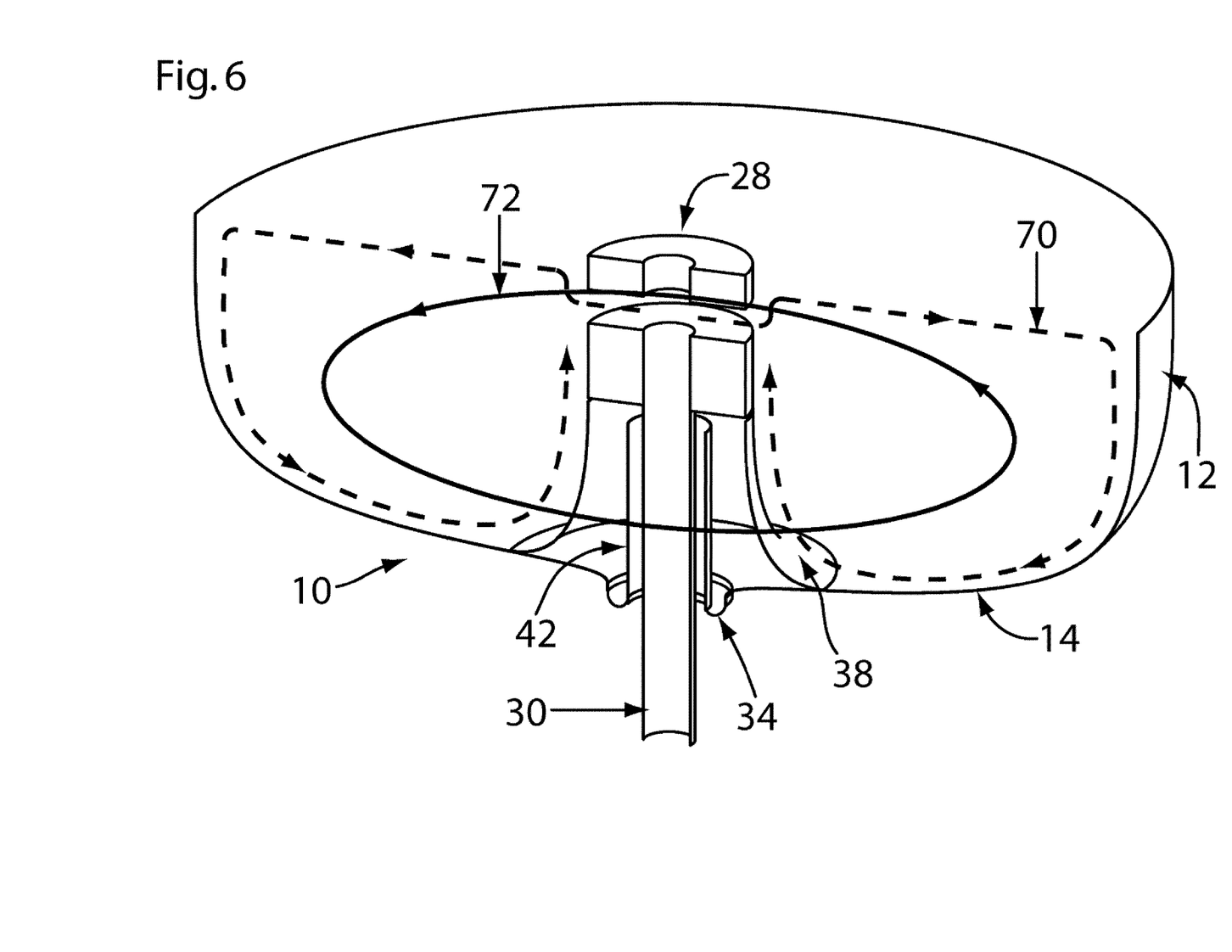
FIG. 6 shows a side isometric cutaway view of the Tank, with induced poloidal flow and secondary toroidal flow directions indicated.

FIG. 6 shows a cutaway view of the Tank 10, illustrating how the platform 28 induces a poloidal flow 70 and a secondary toroidal flow 72 in the directions indicated.

Figure 7:
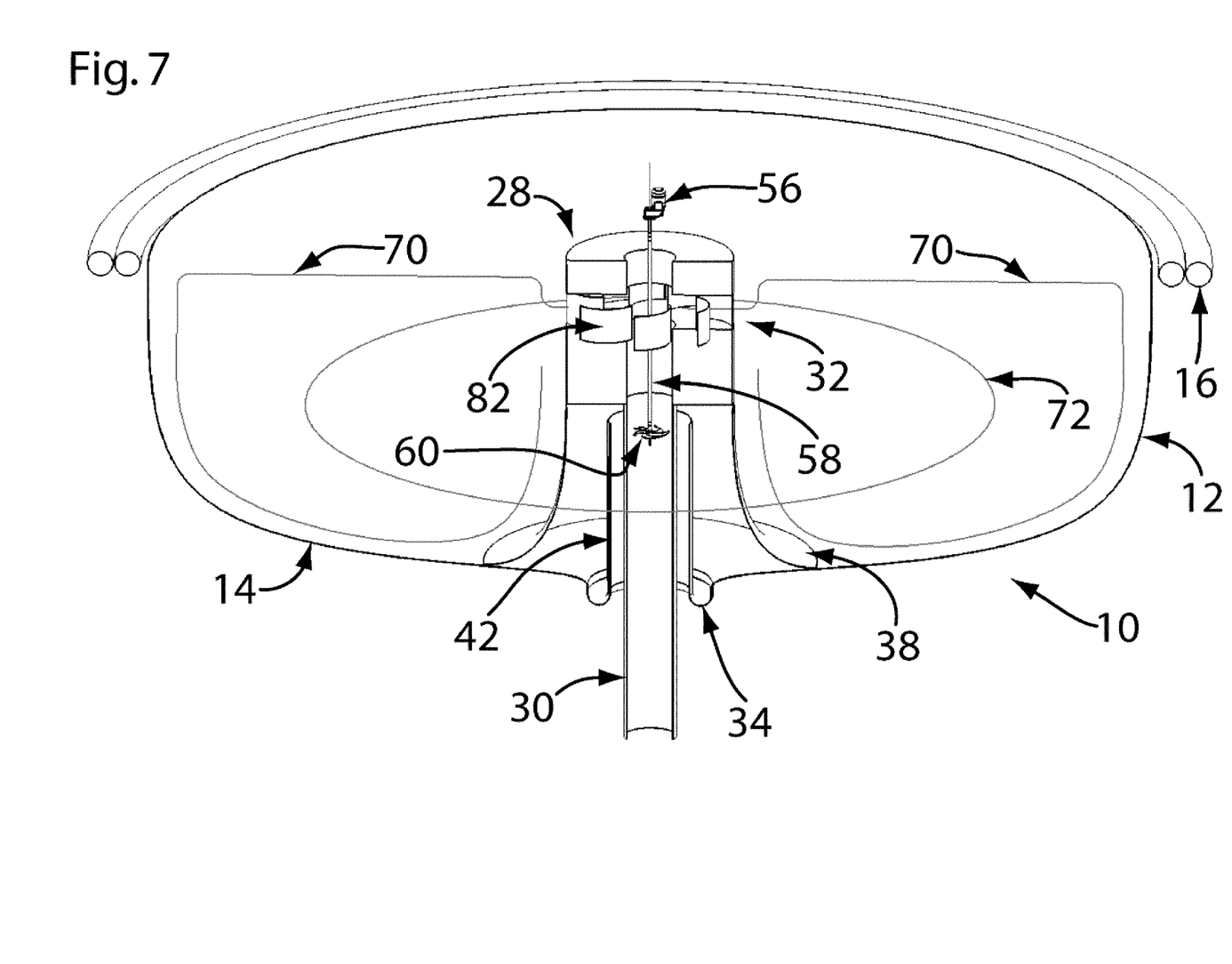
FIG. 7 shows a top isometric cutaway view of the Tank exposing elements of a flow diverter.

FIG. 7 shows a cutaway view of the Tank 10 and focusing on the platform 28 with the vanes 82 of its flow diverter 32 creating the output flow patterns seen in FIG. 6.

Figure 8A:
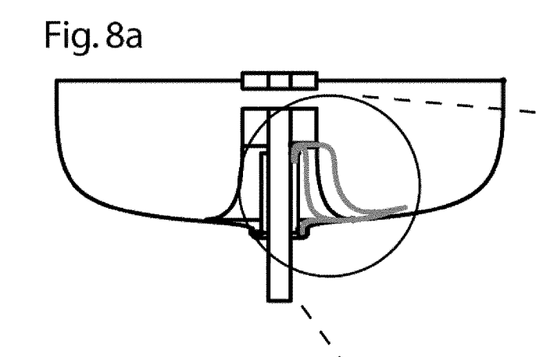
Figure 8B:
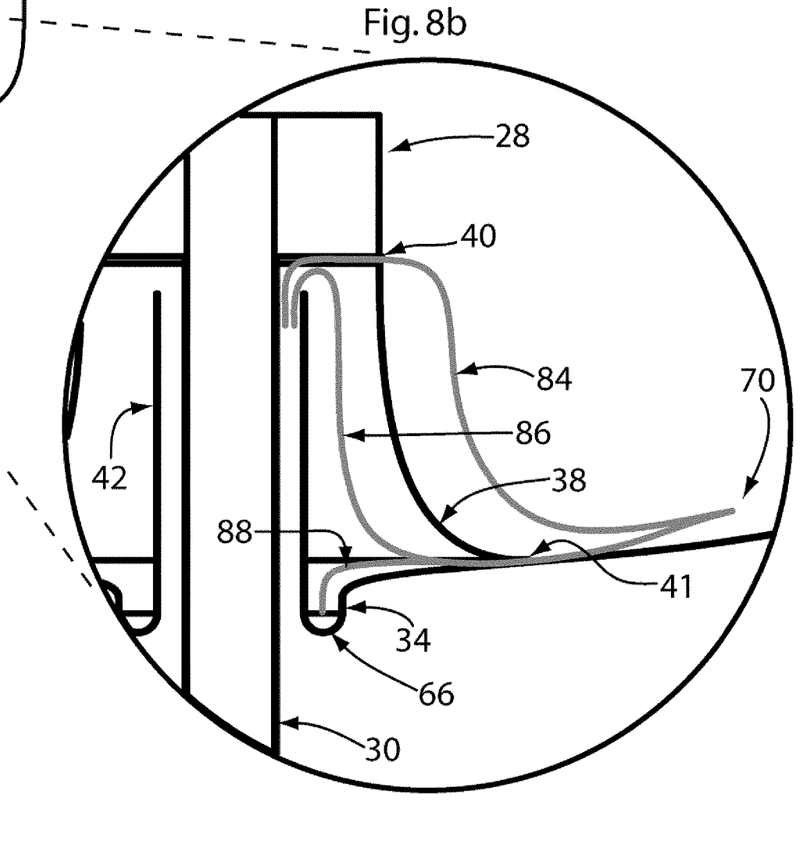
FIG. 8b shows a close-up of the flow patterns around the Filter Skirt.

FIG. 8a shows a reference view of the Tank 10, with FIG. 8b a close-up of the circled area in FIG. 8a showing the drainage flow patterns around the Filter Skirt 38. The majority of poloidal flow 70 becomes outlet flow 84 by following the surface of the filter skirt 38, entering the upper drain 40, then exiting through the standpipe outlet 42. Some of the heavier solid debris 66 of the poloidal flow 70 slides under the bottom of the filter skirt, i.e. the lower drain 41, and then is sucked upwards to exit through the standpipe outlet 42. The heaviest solid debris 66 follows the gutter flow 88 path shown and settles into the annular gutter 34 for later removal.

The floating circulation platform 28, as shown in FIGS. 2 & 4, is a structural truss of metal or fiberglass construction supporting floatation billets 36, typically constructed of foam-filled rotational-molded polyethylene. The central mast assembly 44 is connected by rope stays 50 to brackets 18 supporting the floatation collar 16, providing structural support against wave and tidal forces which act to deform wall 12 of the tank 10.

The filter skirt 38, as shown in FIG. 3, is a tensile fabric structure made of filter medium such as is commonly used for filter presses, centrifuge baskets, and the like. It is supported between the bottom 14 of the tank 10 and the platform 28. Some portion of the effluent flow volume, preferably less than 10%, passes through the annular lower drain slot 41 at the base of the filter skirt 38, carrying heavier settled solid debris 66 via the gutter flow 88 path to the annular gutter 34, from which it is periodically pumped to dewatering and composting equipment located conveniently on shore or barge. Effluent flow with lighter than water debris follows the supernatant flow 86 upward to combine with the main outlet flow 84 from the coaxial upper drain slot, and then leaves the enclosure 10 through the co-axial standpipe outlet 42.

FIG. 5 shows the circulation pattern of the prior art, namely a typical land-based circular rearing tank, where water enters the hatchery tank 74 by means of a tangential flow outlet 76 which creates a spiral circulation path 80 towards the central drain 78 at the bottom of the tank 74. Toroidal flow induces a secondary poloidal flow by the teacup type of momentum coupling effect. Solids settle vertically through the water column to the floor of the tank, and are swept in spiral path 80 toward drain 78.

FIGS. 6 through 8a/b relate the ingoing and outgoing flow and drainage paths necessary to understanding the unique features of the present invention. FIG. 6 shows the circulation flows generated in a large tank 10; FIG. 7 shows how the flow diverter creates the flows necessary for optimal aquaculture rearing, and FIGS. 8a/b show how effluent is safely filtered or trapped.

A tank 10 supported by floatation collars 16 encloses culture water 68, and includes central circulating platform 28 consisting of an intake duct 30, flow diverter 32, pump assembly 54, and mast assembly 44, suspended by flotation billets 36. Water is drawn vertically up the intake duct 30 by the impeller 60, and then diverted radially by flow diverter 32, then outward along the water surface 64, thereby inducing a poloidal flow 70, which eventually mixes with the culture water 68 and primarily exits through the coaxial upper slot drain 40. Poloidal flow 70 also induces a secondary toroidal flow 72 which reduces acceleration of effluent arriving at the primary upper drain 40.

Floating closed-containment aquaculture systems possess proven advantages over net-pen enclosures. A steady, pumped flow of influent water may be drawn from a selected depth within the water column, thereby avoiding extreme temperatures, silt contamination, abnormal salinity, toxic plankton, and motile parasites. Influent water may be oxygenated, and maintained at a pre-determined dissolved oxygen set point by automated means. Fixed enclosure geometry allows improved accuracy of sonar biomass estimation devices. Predators are more effectively separated from the cultured fish, and are unable to see them through the opaque walls of the enclosure. Solid waste, including uneaten feed and fecal matter, may be separated from the effluent stream before it leaves the enclosure.

Previous closed-containment enclosure designs (impervious to water) have not been big enough or sufficiently robust to enable production on a scale comparable with existing net-pen (water permeable) farms. Typical net-pens may enclose 10,000 to 30,000 cubic meters of water, and are stocked with 300 tonnes of live fish. The current invention enables pumped circulation of water within an enclosure of up to 10,000 cubic meters volume, while including a central structural spar, attached by means of rope stays to the perimeter floatation collar, and which supports the tank against environmental loads.

In a surprising aspect of the preferred embodiment, it is found that influent liquid 62 does not travel directly to the standpipe outlet 42 via the upper drain 40, even though a relatively short distance separates the flow diverter 32 and outlet 42. Instead, influent 62 follows the free-surface 64 boundary radially to the perimeter of the tank 10, where it is diverted down the wall 12, radially back to the center axis, and then rises to the upper drain 40. (See FIG. 8b) In a further surprising aspect of the invention, the poloidal induced flow 70 gives rise to a secondary, toroidal flow 72 (i.e. azimuthal flow, about the vertical axis) of greater velocity and momentum than the driven poloidal component. By this means, the overall flow within the tank 10 resembles the laminar boundary layer-induced 'teacup effect' flow observed in smaller tanks, but with greater poloidal component, and at a much larger scale.

The foregoing description of the preferred implementations should be considered as illustrative only, and not limiting. Other embodiments are not ruled out or similar methods leading to the same result. Other techniques and other materials may be employed towards similar ends. Various changes and modifications will occur to those skilled in the art, without departing from the true scope of the invention as defined in the above disclosure, and the following claims.

The invention claimed is:
1. A system for efficiently circulating water in a large volume of rearing space for aquatic organisms, comprising:
  a) an impervious enclosure, having a cylindrical wall, for containing the water and aquatic organisms;
  b) a centrally positioned pump within the impervious enclosure for forcing water from a vertical intake duct through intake ducting to a flow diverter;
  c) a filter skirt for trapping debris, a standpipe outlet providing an exit from the impervious enclosure filtered excess water, and an annular gutter for trapping heavier solid debris not caught by the filter skirt;
in which the flow diverter directs a flow of water radially outward within the enclosure to directly induce a circulation of water within the enclosure from the centrally positioned pump along a surface of the water surface toward cylindrical wall areas of the enclosure, down the cylindrical wall areas, and inward along a floor of the enclosure to a centrally located drain, in a poloidal flow pattern that induces, by momentum coupling, a secondary toroidal flow within the enclosure.

2. The system of claim 1, in which water exits the centrally positioned pump through the flow diverter that directs a flow of water radially outward and induces a poloidal flow to circulate water within the enclosure.

3. The system of claim 1, in which the impervious enclosure is a buoyantly supported tank for use in an open body of water, the intake duct is located outside the tank, and the pump draws influent water from outside the tank via the intake duct for the flow diverter.

4. The system of claim 3, in which floatation collars for buoyantly supporting the tank are secured around a periphery of the tank by brackets.

5. The system of claim 1, in which the flow diverter is centrally located within the impervious enclosure.

6. The system of claim 1, in which the intake duct is vertically oriented.

7. The system of claim 1, in which the pump is a submersible pump inducing vertical upward flow within the intake duct.

8. The system of claim 1, in which the pump comprises a motor which is connected to and rotates an impeller blade by means of an elongated shaft inserted down the intake duct.

9. The system of claim 1, in which the pump and the intake duct are located along the central axis of the impervious enclosure, which is radially symmetric.

10. The system of claim 1, in which the intake duct, the pump, an outlet duct for the flow diverter, are accessible from a central axial service platform within the impervious enclosure.

11. The system of claim 10, further comprising filtration, oxygenation and control subsystems accessible from the central axis circulation platform.

12. The system of claim 1, in which the impervious enclosure is a open-topped tank supported by floatation collars and containing a central circulation platform for the intake duct, the flow diverter, the pump, and having a central mast assembly that is suspended by flotation billets to enable floatation of the central circulation platform within the tank and that is anchored to maintain a central location for the circulation platform within the tank.

13. The system of claim 12, in which the mast assembly comprises poles embedded in the platform, linked by crossmembers, and secured together at the top by a ring which is secured by stays attached to brackets around the periphery of the wall.

14. The system of claim 1, in which the filter skirt comprises a coaxial upper slot drain and an annular lower slot drain.

15. The system of claim 1, in which the standpipe outlet duct is a vertical standpipe outlet duct that is located coaxially to the intake duct, and below the flow diverter.

16. The system of claim 1, in which the impervious enclosure comprises a cylindrical wall, a circular bottom, and a central portion holding the intake duct.

17. The system of claim 1, in which the flow diverter is mounted on a floating circulation platform.

18. The system of claim 1, in which the flow diverter comprises a plurality of vanes.

19. The system of claim 18, in which the plurality of vanes is concentric series of curved vanes.

20. The system of claim 17, in which the flow diverter comprises a concentric series of curved vanes that divert a flow of influent liquid pumped up the intake duct and radially spreads the flow of influent liquid along a surface of water within the enclosure from the floating circulation platform to a wall of the impervious enclosure.

21. The system of claim 1, in which the flow diverter induces the poloidal flow and a secondary toroidal flow of water within the impervious enclosure.

22. The system of claim 21, in which a majority of poloidal flow becomes outlet flow by following the surface of a filter skirt entering an upper drain then exiting through a standpipe outlet.

23. The system of claim 1, in which the filter skirt is a tensile fabric structure made of filter medium.

24. The system of claim 22, in which a heavier portion of solid debris in the poloidal flow slides under the bottom of the filter skirt, and is then is sucked upwards to exit through the standpipe outlet.

25. The system of claim 23, in which a heaviest portion of solid debris settles into an annular gutter for later removal.

26. The system of claim 1, in which a floating central circulation platform holding the intake duct and the flow diverter is a structural truss of supporting floatation billets made of foam-filled rotational-molded polyethylene.

27. The system of claim 11, in which the central mast assembly is connected by rope stays to brackets supporting the floatation collar, providing structural support against wave and tidal forces.

28. The system of claim 22, in which a minority of effluent flow volume passes through an annular lower drain slot at a base of the filter skirt carrying heavier settled solid debris via a gutter flow path to an annular gutter from which it is periodically pumped.

29. The system of claim 1, in which effluent flow with debris that is lighter than water follows a supernatant flow upward to combine with a main outlet flow from a coaxial upper drain slot, and then leaves the enclosure through a co-axial standpipe outlet.

30. The system of claim 1, in which the impervious enclosure has opaque walls.

31. The system of claim 1, in which influent liquid travels from the flow diverter indirectly to a standpipe outlet that is adjacent to the flow diverter by following a free-surface boundary radially to the perimeter of the enclosure, where it is diverted down a wall of the enclosure, radially back toward a center axis of the enclosure, and then rises to upper drain standpipe outlet.

32. The system of claim 2, in which the poloidal flow gives rise to a Secondary toroidal flow of greater velocity than the poloidal velocity.

33. The system of claim 2, in which: a) the impervious enclosure is a buoyantly supported tank for use in an open body of water, the intake duct is located outside the tank, and the pump draws influent water from outside the tank via the intake duct for the flow diverter, floatation collars for buoyantly supporting the tank being secured around a periphery of the tank by brackets, b) the flow diverter is centrally located within the impervious enclosure, the intake duct is vertically oriented, the pump is a submersible pump inducing vertical upward flow within the intake duct, comprising a motor which is connected to and rotates an impeller blade by means of an elongated shaft inserted down the intake duct, and the pump and the intake duct are located along the central axis of the impervious enclosure, which is radially symmetric, c) the intake duct, the pump, an outlet duct for the flow diverter, are accessible from a central axial service platform within the impervious enclosure.

34. The system of claim 33, in which: a) the impervious enclosure is an open-topped tank supported by floatation collars and containing a central circulation platform for the intake duct, the flow diverter, the pump, and having a central mast assembly that is suspended by flotation billets to enable floatation of the central circulation platform within the tank and that is anchored to maintain a central location for the circulation platform within the tank; b) the mast assembly comprises poles embedded in the platform, linked by cross-members, and secured together at the top by a ring which is secured by stays attached to brackets around the periphery of the wall; c) the standpipe outlet is a vertical standpipe outlet duct that is located coaxially to the intake duct, and below the flow diverter; d) the tank comprises a cylindrical wall, a circular bottom, and a central portion holding the intake duct.

35. The system of claim 34, in which: a) the flow diverter comprises a concentric series of curved vanes that divert a flow of influent liquid pumped up the intake duct and radially spreads the flow of influent liquid along a surface of water within the enclosure from the floating circulation platform to a wall of the impervious enclosure; b) the flow diverter induces a poloidal flow and a secondary toroidal flow of water within the impervious enclosure, the poloidal flow giving rise to a secondary, toroidal flow of greater velocity than the poloidal velocity; c) a majority of poloidal flow becomes outlet flow by following the surface of a filter skirt, entering an upper drain, then exiting through a standpipe outlet; d) the filter skirt is a tensile fabric structure made of filter medium; e) a heavier portion of solid debris in the poloidal flow slides under the bottom of the filter skirt, and is then is sucked upwards to exit through the standpipe outlet; f) a heaviest portion of solid debris settles into an annular gutter for later removal; g) a minority of effluent flow volume passes through an annular lower drain slot at a base of the filter skirt, carrying heavier settled solid debris via a gutter flow path to an annular gutter, from which it is periodically pumped; h) effluent flow with debris that is lighter than water follows a supernatant flow upward to combine with a main outlet flow from a coaxial upper drain slot, and then leaves the enclosure through a co-axial standpipe outlet; i) influent liquid travels from the flow diverter indirectly to a standpipe outlet that is adjacent to the flow diverter by following a free-surface boundary radially to the perimeter of the enclosure, where it is diverted down a wall of the enclosure, radially back toward a center axis of the enclosure, and then rises to upper drain standpipe outlet.

36. The system of claim 35, in which a) the floating central circulation platform holding the intake duct and the flow diverter is a structural truss of supporting floatation billets made of foam-filled rotational-molded polyethylene; b) the central mast assembly is connected by rope stays to brackets supporting the floatation collar to provide structural support against wave and tidal forces.

* * * * *